United States Patent
Donovan et al.

(10) Patent No.: US 7,389,499 B2
(45) Date of Patent: Jun. 17, 2008

(54) METHOD AND APPARATUS FOR AUTOMATICALLY CONVERTING NUMERIC DATA TO A PROCESSOR EFFICIENT FORMAT FOR PERFORMING ARITHMETIC OPERATIONS

(75) Inventors: Robert John Donovan, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 10/970,408

(22) Filed: Oct. 21, 2004

(65) Prior Publication Data

US 2006/0101425 A1    May 11, 2006

(51) Int. Cl.
  *G06F 9/45* (2006.01)
(52) U.S. Cl. .................. 717/143; 717/140; 717/141; 708/204; 708/495
(58) Field of Classification Search ................ 708/131, 708/170, 204, 495; 717/140–162
See application file for complete search history.

(56) References Cited

U.S. PATENT DOCUMENTS

| | | | |
|---|---|---|---|
| 6,256,776 B1* | 7/2001 | Melanson | 717/124 |
| 6,266,769 B1* | 7/2001 | Abdallah et al. | 712/221 |
| 6,460,177 B1* | 10/2002 | Lee | 717/146 |
| 6,671,796 B1* | 12/2003 | Sudharsanan et al. | 712/222 |
| 7,080,364 B2* | 7/2006 | Tang et al. | 717/140 |
| 7,236,995 B2* | 6/2007 | Hinds | 708/204 |
| 2002/0059354 A1* | 5/2002 | Uchida | 708/495 |
| 2004/0210869 A1* | 10/2004 | DeVane | 717/114 |
| 2005/0065990 A1* | 3/2005 | Allen | 708/495 |

* cited by examiner

*Primary Examiner*—Wei Y. Zhen
*Assistant Examiner*—Matthew J Brophy
(74) *Attorney, Agent, or Firm*—Roy W. Truelson (57) ABSTRACT

A compiler (or interpreter) detects source language instructions performing arithmetic operations using a fixed point format (preferably packed decimal). Where the operation can be performed without loss of precision or violation of other constraints of the source language, the compiler automatically converts the operands to a floating point format (preferably Decimal Floating Point (DFP)) having hardware support, and re-converts results to the original fixed point format. Preferably, the compiler may combine multiple operations and instructions in an expression tree, analyze the tree, and selectively convert where possible. The compiler preferably performs a heuristic cost judgment in determining whether to use a particular conversion.

7 Claims, 8 Drawing Sheets

TRANSFORMED TREE

FIG. 8

METHOD AND APPARATUS FOR AUTOMATICALLY CONVERTING NUMERIC DATA TO A PROCESSOR EFFICIENT FORMAT FOR PERFORMING ARITHMETIC OPERATIONS

FIELD OF THE INVENTION

The present invention relates to digital data processing, and in particular to methods and apparatus for compilation and/or interpretation of computer programming code.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which form a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software with enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed. In particular, a large and varied set of high-level languages was developed for supporting the creation of computer software.

Typically, high-level languages represent instructions, fixed values, variables, and other constructs in a manner readily understandable to the human programmer rather than the computer. Such programs are not directly executable by the computer's processor. In order to run on the computer, the programs must first be transformed from a human-readable form (source code) to something executable by the computer. In general, source code is universal and understandable by anyone trained to use the applicable language, while executable code is specific to a particular computer system environment (model of hardware, operating system, etc.), and can only execute on that computer system or one similarly configured.

The fundamental purpose of high-level languages is to make it easier for humans to write programs to perform useful work. A high-level language does not, in general, increase the efficient utilization of machine resources. The continual decline in the cost of machine resources vis-a-vis human resources makes it imperative that development efforts concentrate on the efficient use of human resources. Accordingly, forty years of high-level language evolution have not produced executable programs which are more efficient, from the standpoint of using machine resources, than code produced using older techniques. On the contrary, code produced from modern high-level languages tends to be significantly less efficient in its use of machine resources. Although efficient use of human resources must command a higher priority than efficient machine resource utilization, there is still a motivation to improve the efficiency of machine resource utilization, provided that this can be done without adversely affecting the utilization of human resources. Specifically, there is a motivation to improve the efficiency of machine resource utilization in code generated from a high-level language, without changing the semantics of the language or requiring manual intervention by the programmer.

One of the many ways in which high-level languages favor the utilization of human resources over machine resources is in the representation of numeric data. Digital computer hardware is binary in nature, and the most natural way for a computer to represent numbers is in an exclusively binary format. However, in most human cultures, numbers are represented in base ten. Many high level languages support one or more base ten numeric representations which, although not necessarily the most machine-efficient, are easier for humans to manipulate and understand.

A common base ten numeric representation is a packed decimal format (also called "binary coded decimal"). In packed decimal format, a number is represented in a series of 8-bit bytes, where four bits of every byte are allocated to a single decimal digit, allowing each byte to represent two decimal digits. One of the 4-bit patterns is allocated to a sign (positive or negative). A packed decimal number can be of any specified length, up to a limit imposed by the applicable language, with an implicit decimal point assumed at some fixed location. Packed decimal format has the advantage of supporting the representation of "exact" numbers over a large range, without rounding inaccuracies. It is thus useful in many accounting and other business applications.

Processor arithmetic using numeric representations in packed decimal format is much less efficient than arithmetic using binary representations. Even simple addition is complicated by the need to propagate carries from one digit to the next. Multiplication and division using packed decimal representations are far more complex, and are typically performed using relatively lengthy library routines. It would be desirable to find more machine-efficient techniques for performing arithmetic using packed decimal numeric representation.

Modern processors contain hardware support for a variety of arithmetic operations using different data types. Recently, an IEEE standard (draft standard IEEE 754R) has been proposed for operations on a Decimal Floating Point (DFP) format. As used herein, "DFP" refers specifically to a decimal floating point format according to the IEEE 754R draft standard, or to any revision or successor thereof. It is anticipated that newer processor designs will include the capability to perform operations on these data types in hardware. Inclusion of hardware support for DFP format would make operations on this type of data relatively fast and efficient, significantly faster than operations on packed decimal data.

DFP is intended for different uses than packed decimal format. The decimal digits are encoded using a different, more compact representation. Unlike packed decimal, DFP format is a floating point format in which arithmetic operations can produce rounding errors. However, DFP does support a large number of (up to 34) decimal digits of precision.

Although not generally recognized in the art, certain operations conventionally performed using packed decimal arithmetic could alternatively be performed using DFP arithmetic. Use of DFP arithmetic would enable the operations to be performed using processor hardware designed for DFP operations, achieving a substantial increase in machine efficiency. It would be possible for a programmer to manually convert packed decimal representations to DFP representations where appropriate, performing corrective action to assure proper treatment of rounding and other issues. However, such a conversion would be a substantial burden on the programmer (a substantial cost of human resources), and would contravene the general principle that human resources are to be given a higher priority than machine resources. An unrecognized need therefore exists for an automated method which will, in appropriate cases, substitute DFP operations for packed decimal operations.

SUMMARY OF THE INVENTION

A compiler (or interpreter) detects source language instructions in programming code which perform arithmetic operations using operands in a fixed point format. Where the operation can be performed without loss of precision or violation of other constraints of the source language, the compiler automatically converts the operands to a floating point format having hardware support for arithmetic operations, and re-converts results to the original fixed point format.

In the preferred embodiment, the fixed point decimal format is a packed decimal format. The floating point format is a Decimal Floating Point (DFP) representation according to IEEE standard 754R, or any successor or revisions thereof, it being understood that the present invention might alternatively apply to conversions involving other formats.

In the preferred embodiment, the compiler may combine multiple arithmetic operations, which may be contained in different instructions, in an expression tree. The compiler may convert all of the tree, or only a portion of it. The compiler does not necessarily re-convert intermediate results, but generally maintains intermediate results in the DFP representation. In some cases, results need not be re-converted to the original packed decimal format until they are stored.

In the preferred embodiment, the compiler does not necessarily convert all operations which can be converted without violating language constraints. In the case of certain simple operations, the cost of converting and re-converting between the two formats may outweigh any performance benefit of using the floating point hardware. The compiler makes a heuristic judgment whether conversion to DFP format will achieve a performance improvement, and performs the conversion only where it is expected to result in improved performance.

Converting operands in a machine inefficient format, such as packed decimal, to a floating point format having hardware support permits source arithmetic instructions in packed decimal to be executed efficiently using the hardware. Where the source operations are complex, particularly where multiplication and/or division is involved, the floating point hardware is substantially more efficient than library routines often used for packed decimal arithmetic. At the same time, conversion and re-conversion is performed entirely by the compiler, without the need for the programmer to alter the original source code.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
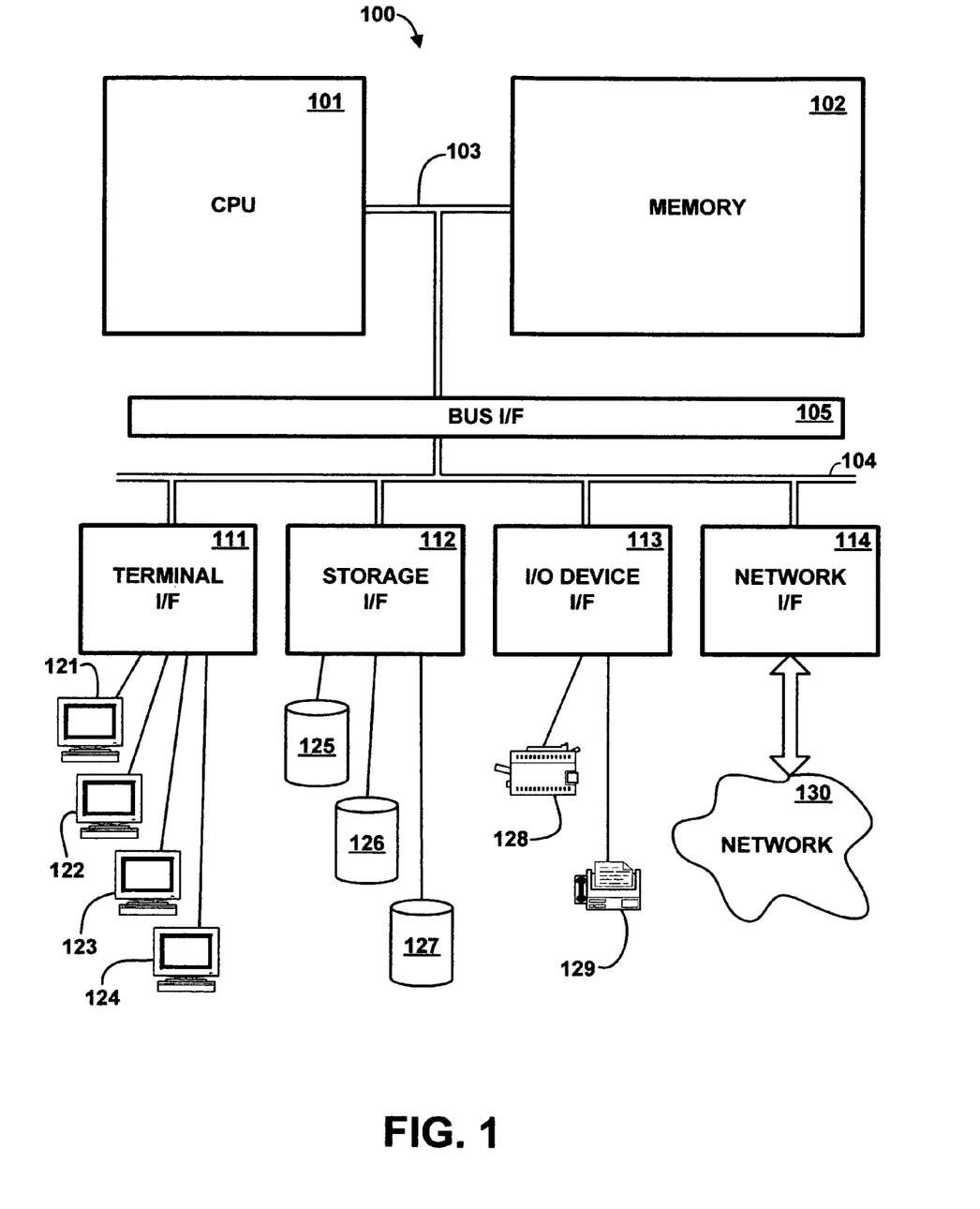
FIG. 1 is a high-level block diagram of the major hardware components of a computer system which automatically converts numeric operands in source code to a processor-efficient format, according to the preferred embodiment of the present invention.

Referring to the Drawing, wherein like numbers denote like parts throughout the several views, FIG. 1 is a high-level representation of the major hardware components of a computer system 100 which automatically converts numeric operands in source code to a processor-efficient format, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus 104 may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I(O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
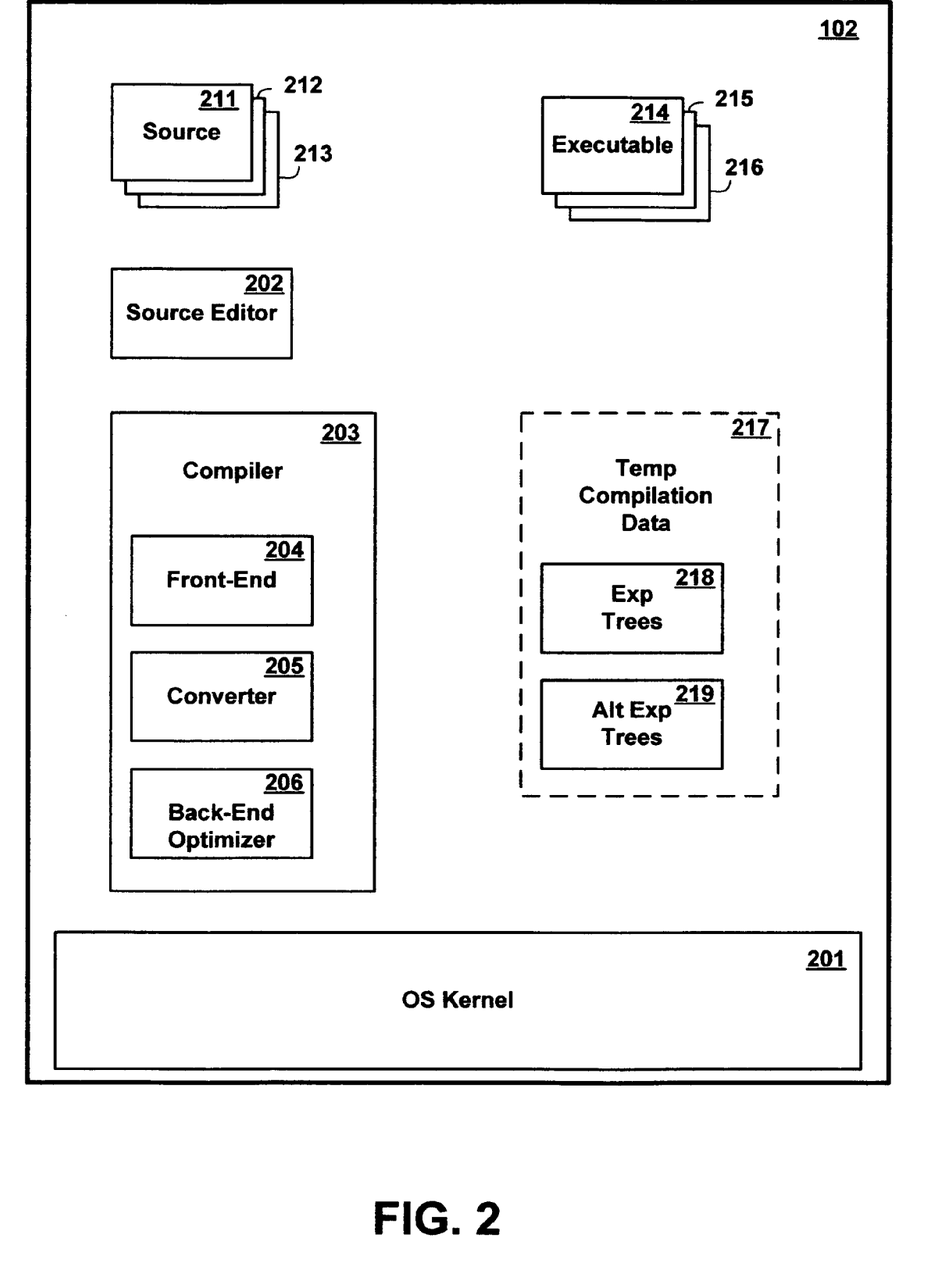
FIG. 2 is a conceptual illustration of the major software components of a computer system for automatically converting numeric operands to a processor-efficient format, according to the preferred embodiment.

FIG. 2 is a conceptual illustration of the major software components of system 100 in memory 102. Operating system 201 provides various low-level software functions, such as device interfaces, management of memory pages, management and dispatching of multiple tasks, etc. as is well-known in the art. Various programs comprise a code development environment, such as source editor 202 and compiler 203, producing executable program code from code written in a source form, which is generally human-readable source. A complete code development environment may include additional software components (not shown), such as a debugger, build utility, version tracking software, and so forth. Depicted in FIG. 2 are a multiple source modules 211-213, and executable object code modules 214-216, intended to represent corresponding modules, i.e., object code module 214 is produced from source module 211.

Source editor 202 is an executable computer program which supports the creation and editing of source code for other computer programs, using any of various known techniques. Source files 211-213 represents files containing source code, which are created and edited using source editor 202. Source editor 202 could be a general-purpose text editor which is non-specific to a programming language and has no diagnostic capabilities, or could be a special-purpose source editor (typically for a particular high-level language) having built-in syntax checking or other diagnostic support features, as are known in the art.

Compiler 203 compiles source files 211-213 in human readable form to executable code 214-216 in the form of instructions executable on a computer processor. Compiler 203 includes a front-end compilation section 204, a numeric converter optimizer function 205, and a back-end compilation section 206. In general, front-end 204 parses the source code to determine the structure of program control flow and the required executable commands. Numeric converter optimizer 205 performs a specific optimization with respect to data in packed decimal format, whereby under appropriate circumstances the data is automatically converted to a decimal floating point format, and re-converted after some arithmetic operation(s) have been performed, as described more fully herein. Back-end compilation section 206 generally converts parsed data to executable code, determines register and memory address assignments, and performs certain optimizations.

Although not depicted in FIG. 2, in some development environments a front-end compiler produces code in an intermediate representation, between source code and executable code. Intermediate representations may take any of various forms, but typically they provide some form of commonality between different source or object forms. I.e., source code written in different forms may be compiled by different front-end compilers to a common intermediate form for further compilation by a common back-end compiler. Alternatively, source code may be compiled by a single front-end compiler to a common intermediate form for use on different hardware platforms, the common intermediate form being then compiled by different back-end compilers associated with different respective hardware. The present invention is applicable to development environments employing an intermediate code representation, as well as those which do not. In general, where a front-end compiler compiles code to an intermediate representation, it is preferred that converter optimizer 205 perform any numeric conversions after the intermediate representation, i.e., the intermediate representation contains a translation of the source code in which packed decimal arithmetic has not been changed to decimal floating point. The reason for this is that numeric conversion is likely to be processor-specific, and will only produce a benefit where the processor has special hardware for performing decimal floating point arithmetic.

During compilation, compiler 203 produces various temporary data structures, shown generally in dashed lines as feature 217. For example, temporary data structures 217 could include control flow graphs, parsed code representations, listings of variables used and scope of usage, as are known in the compiler art. Among the temporary data structures are a set of expression trees 218 for arithmetic expressions to be evaluated by the executing code. At least some of these expression trees are expressions evaluated in packed decimal format. Temporary data 217 further includes a set of alternate expression trees 219, containing alternate form expressions for at least some of the expression trees in packed decimal format, in which packed decimal variables are converted to decimal floating point, as explained further herein.

In addition to source editor 202 and compiler 203, system 100 may include any of various user applications (not shown) or other software entities. Such user applications may include, e.g., personnel records, accounting, mail, calendaring, or any of thousands of user applications.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex code development environment, the number and complexity of such entities is typically much larger. Additionally, although software components 202-206 and 211-219 are depicted in FIG. 2 on a single computer system 100 for completeness of the representation, it is not necessarily true that all programs, functions and data will be present on a single computer system or will be performed on a single computer system. For example, editing of source code may be performed by source editors located in a distributed manner in individual workstations, while compilation of code might be performed by a centralized server.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. Furthermore, it will be understood that the conceptual representation of FIG. 2 is not meant to imply any particular memory organizational model, and that system 100 might employ a single address space virtual memory, or might employ multiple virtual address spaces which overlap.

In accordance with the preferred embodiment of the present invention, a compiler for compiling computer programming code in a source language to executable instructions identifies expressions involving a packed decimal format, and automatically converts certain expressions to a processor-efficient format, specifically Decimal Floating Point (DFP) format according to draft standard IEEE 754R, or any successor or revision thereof. In order to maintain compatibility with the original source, numerical values are converted only temporarily for purposes of performing one or more calculations using a more processor-efficient format, and are eventually converted back to the original format specified in the source code for storage, display, or other output. The conversion and operations using the converted (DFP) format are performed in such a manner that the external behavior of the program is the same as it would have been had the operations been performed using conventional packed decimal routines without conversion. I.e., numerical values are rounded or truncated in the same manner; error messages are generated for the same conditions, and so forth. The conversion is therefore completely transparent to the programmer. It requires no changes to the original source code.

The draft IEEE 754R standard defines three DFP types: a 32-bit type, a 64-bit type, and a 128-bit type. Of these, only the 64-bit and the 128-bit (herein referred to as DFP64 and DFP128, respectively) are used in the preferred embodiment. DFP128 supports a 34-digit decimal mantissa, while DFP64 supports a 16-bit decimal mantissa.

Figure 3:
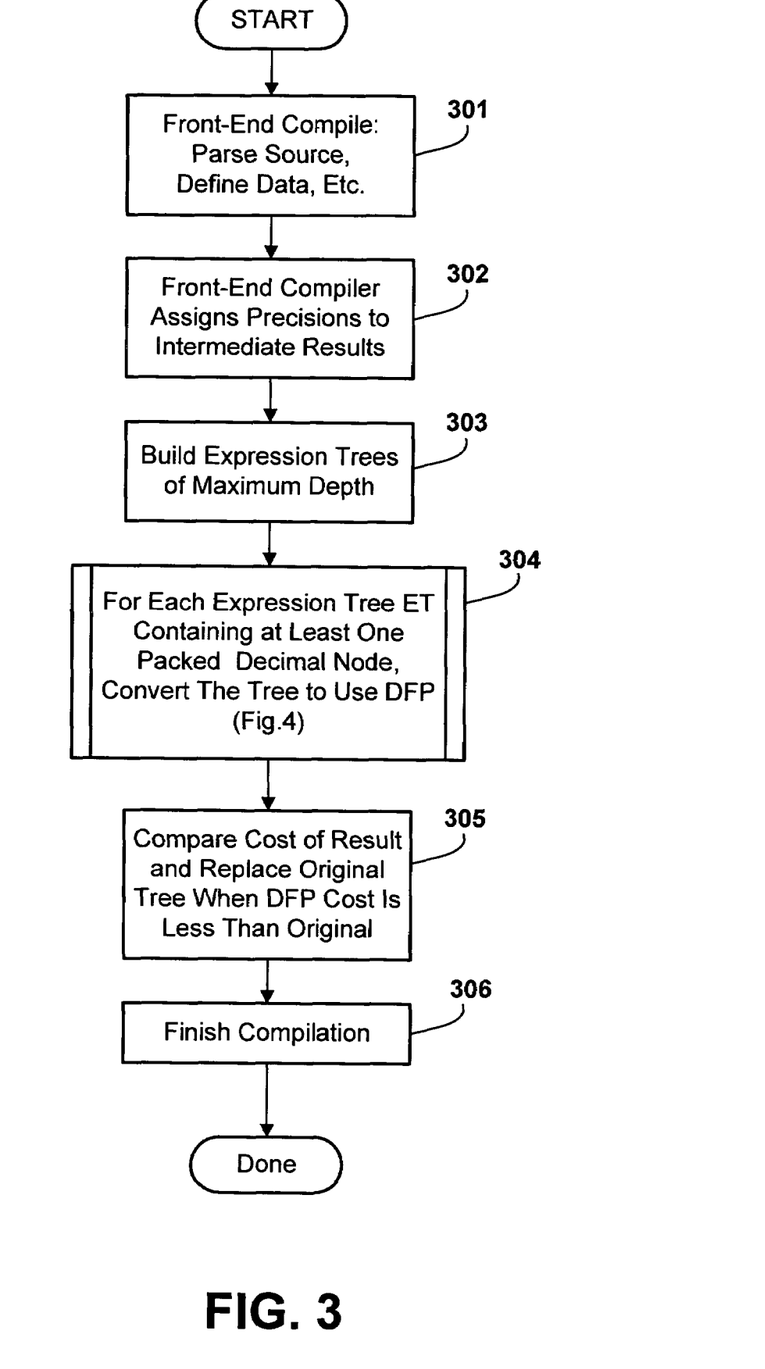
FIG. 3 is a high-level flow diagram of a process for generating executable code in which certain packed decimal operands in the source code are automatically converted to decimal floating point representation for performing arithmetic calculations, according to the preferred embodiment.

FIG. 3 shows at a high level a process of generating executable code in which certain packed decimal operands in the source code are automatically converted to decimal floating point representation for performing arithmetic calculations, according to the preferred embodiment. Referring to FIG. 3, front end compilation section 204 of compiler 203 performs a conventional front-end compilation (step 301). The conventional front-end compilation parses the source code to determine the overall program control flow, and the required data structures and operations, as is known in the art. Among the tasks performed during front-end compilation is the assigning of a respective precision to each intermediate result of an expression (step 302), and the building of expression trees 218 of maximum depth (step 303). Although these steps are conventionally known as part of the front-end compilation process, they are represented separately in FIG. 3 because the process of replacing certain expressions as described herein uses the results of these steps. Although steps 301-303 are represented separately in FIG. 3 in a particular order, it will be understood that front-end compilation may involve numerous steps performed in a different order, and in particular that the assigning of a respective precision to each intermediate result and building of expression trees might be performed in a different order, and might be performed before some of the other front-end compilation steps, represented generally as step 301, are completed.

With the front-end compilation, represented generally as steps 301-303, complete, the compiler constructs, where possible, an alternative expression tree 219 for each expression tree 218 containing at least one packed decimal value (i.e., a packed decimal node), in which the alternative expression tree 219 contains an equivalent expression using decimal floating point nodes in place of the packed decimal nodes. This process is represented in high-level FIG. 3 as step 304, and is shown in further detail in FIGS. 4-6.

Figure 5:
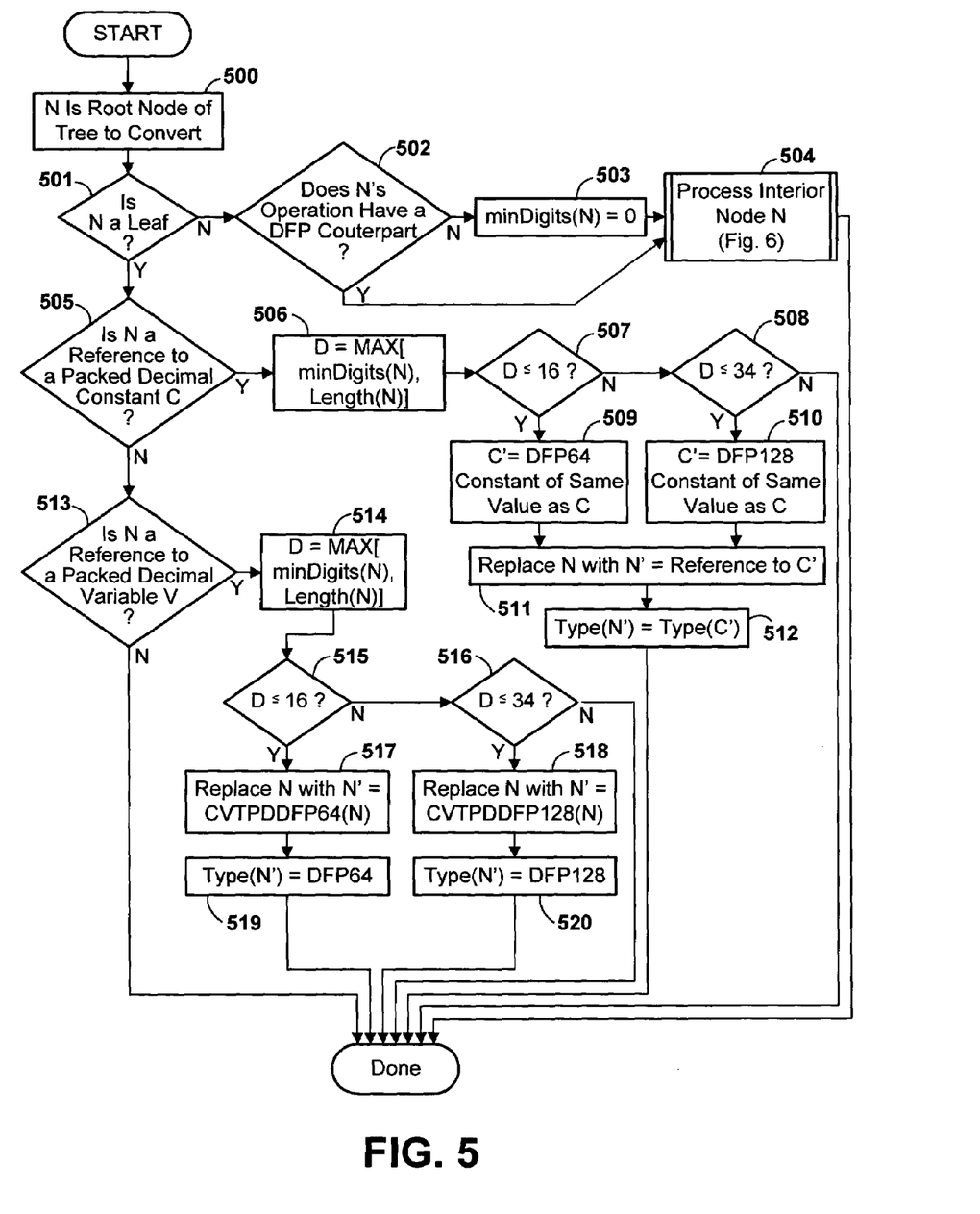
FIGS. 5 and 6 are a flow diagrams showing in expanded form a recursive process for traversing nodes of a tree or subtree to generate equivalent DFP expressions, within the process of FIG. 4, according to the preferred embodiment.
Figure 6:
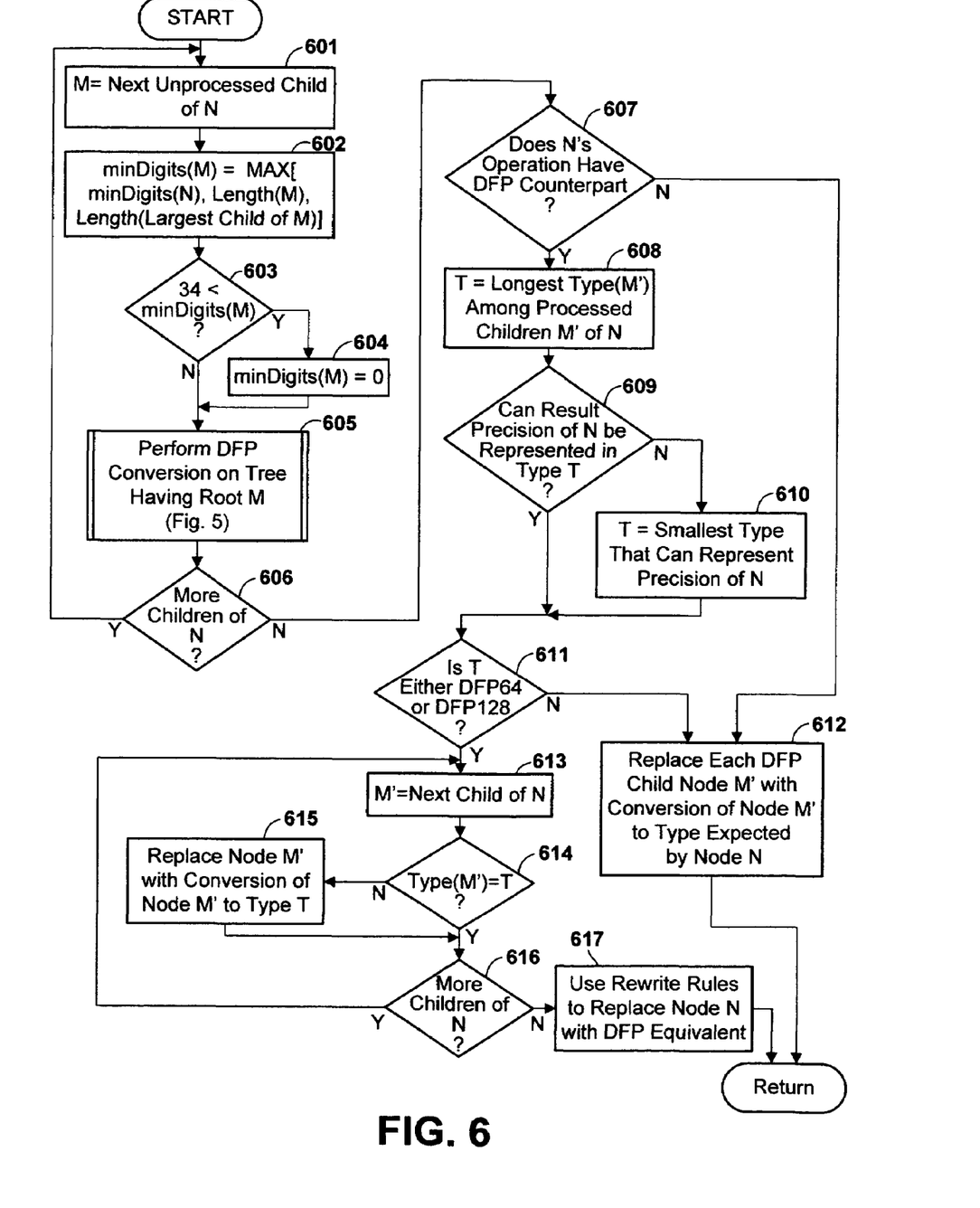

An alternate expression tree 219 is constructed as a recursive process, in which the nodes of the alternate expression tree 218 are traversed down to the leaves and transformed where possible. The recursive portion of the process is shown in FIGS. 5-6. In the general case, constructing an alternate expression tree consists of calling this recursive procedure for the entire expression tree. However, if the root node of the expression tree is an assignment operation, this is treated as a special case. In this special case, the left hand side (LHS) of the expression tree is a single leaf node representing the program variable to receive the assigned value, and the recursive procedure of FIGS. 5-6 is called only for the sub-tree representing the right hand side (RHS) of the original expression tree. The reason for this difference relates to the use of the variable minDigits, which is a heuristic device in which lower nodes in the tree "inherit" a minimum required number of digits from a higher node, in order to force the lower nodes to use a larger than minimally necessary DFP size in order to avoid subsequent conversion. In the case of the assignment, the value of minDigits can be initialized to the value of the LHS of the expression tree, forcing nodes in the RHS having a smaller number of digits to be converted to the larger value (to avoid a later conversion from a smaller DFP size to a larger DFP size). At will be seen, where the LHS of the expression tree exceeds 34 (the largest decimal precision that can be represented in DFP format), minDigits is set to zero to avoid "inheriting" a value.

Figure 4:
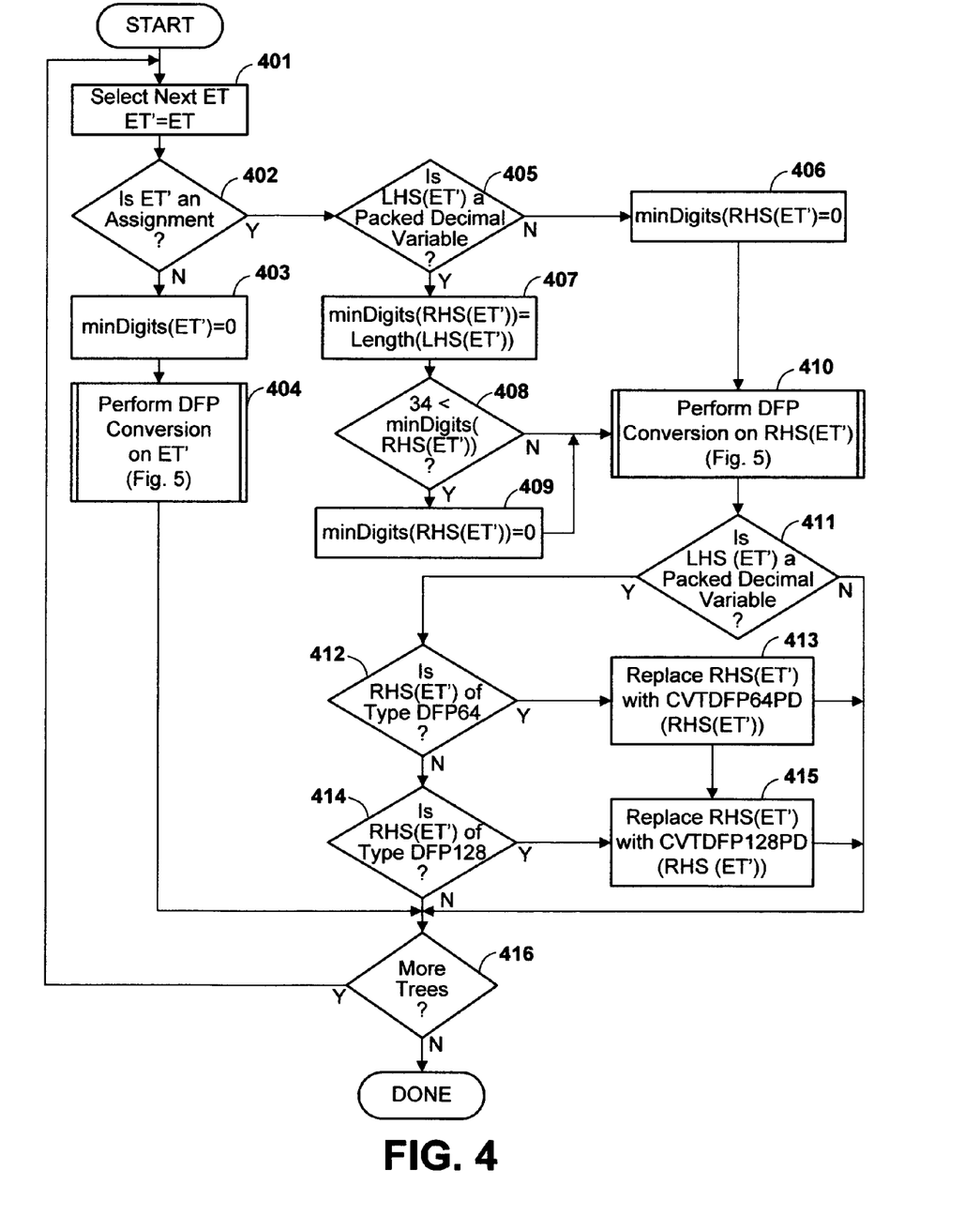
FIG. 4 is a flow diagram showing in expanded form a process for constructing an alternate expression tree using equivalent DFP expressions in place of packed decimal, within the process of FIG. 3, according to the preferred embodiment.

Referring to FIG. 4, the compiler selects an expression tree 218 for processing from among the expression trees having at least one packed decimal value, and initializes an alternate expression tree 219 (ET') identical to the original selected expression tree ET (step 401). The compiler determines whether the root node of the selected expression tree is an assignment (step 402). If not, minDigits of the alternate expression tree is set to zero (step 403), and the general recursive procedure for traversing the expression tree and performing DFP conversion is called on the entire alternate expression tree ET' (step 404). This recursive conversion process is explained in greater detail below with respect to FIGS. 5 and 6.

In the special case where the root of ET is an assignment (the 'Y' branch from step 402), the compiler determines whether the LHS of the assignment is a packed decimal variable (step 405). If so, minDigits of the RHS of ET' is initialized to the length of the LHS of the assignment, i.e., the length of the variable which is assigned a value by the assignment statement (step 407). If minDigits (the length of the LHS of the assignment) is more than 34, then the 'Y' branch is taken from step 408, and minDigits is set of 0 (step 409). The reason for this limitation is that 34 is the maximum number of decimal digits representable in a DFP format. Setting minDigits to greater than 34 would simply prevent all use of DFP formats in the tree, when in fact it may be possible to advantageously convert a subtree of ET to a DFP format. If, at step 405, the LHS is not a packed decimal variable, then minDigits of the RHS is initialized to zero (step 406). In any of these cases, the recursive procedure for traversing the tree and performing DFP conversion is then called for the RHS of the alternate expression tree (RHS(ET')) only, rather than the entire tree (step 410).

Referring to FIG. 5, when the recursive procedure for traversing the tree is called, N is set to the root node of the tree to convert, as represented by block 500. If N is a leaf node, the 'Y' branch is taken from step 501. A leaf node is either a variable or a constant, either of which could be (although not necessarily are) in packed decimal form.

If the leaf node N is a reference to a packed decimal constant C, the 'Y' branch is taken from step 505. In this case, D is set to the greater of (a) the value of minDigits for the tree represented by node N (i.e., the "inherited" value) and (b) the length of node N (step 506). If D≦16 (the 'Y' branch from step 507), then the corresponding constant C' is set to a constant of type DFP64, having the same value as constant C (step 509). If, at step 507, D>16, the 'N' branch is taken to step 508. If D≦34, the 'Y' branch is taken from step 508, and C' is set to a constant of type DFP128, having the same value as constant C (step 510). In the case where either the 'Y' branch from step 507 or step 508 is taken, the corresponding node N in alternate expression tree ET' is converted to a node N', comprising a reference to constant C' (step 511), and the type of node N' (Type(N')) is set to the type of constant C' (step 512). The recursive procedure then returns. If, at step 508, D>34, then it is impossible to convert to a DFP format without loss of precision, and the recursive procedure returns without performing any conversion (shown as the 'N' branch from step 508).

If the leaf node N is a reference to a packed decimal variable V, then the 'Y' branch is taken from step 513. In this case, D is set to the greater of (a) the value of minDigits for the tree represented by node N, and (b) the length of node N (step 514). If D≦16 (the 'Y' branch from step 515), then node N in the alternate expression tree is replaced by the sub-tree N', equal to a conversion of the packed decimal variable V to a DFP64 value, represented as N'=CVTPDDFP64(N) (step 517). N' is in fact a subtree of two nodes, in which the leaf node is the original node N referencing packed decimal variable V, and the root node is the conversion function CVTPDDFP64, which converts a packed decimal value to a corresponding value in DFP64 format. The type of the root node of N' (Type(N')) is set to DFP64 (step 519), and the recursive procedure returns. If, at step 515, D>16, the 'N' branch is taken to step 516. If D≦34, the 'Y' branch is taken from step 516, and node N in the alternate expression tree is replaced by the sub-tree N', equal to a conversion of the packed decimal variable V to a DFP128 value (step 518), i.e. N'=CVTPDDFP128(N), where CVTPDDFP128 is the conversion function which converts a packed decimal value to a corresponding value in DFP128 format. As in the case of step 517 explained above, N' is a two-node subtree, in which the leaf is the same as original node N and the root is the conversion function. The type of the root node of N' is then set to DFP128 (step 520), and the recursive procedure returns. If, at step 516, D>34, then it is impossible to convert to a DFP format without loss of precision, and the recursive procedure returns without performing any conversion (shown as the 'N' branch from step 516).

If node N is a leaf, but is neither a packed decimal constant nor a packed decimal variable (the path indicated by the 'Y' branch from step 501, the 'N' branch from step 505 and the 'N' branch from step 513), then no conversion is performed and the procedure returns.

Referring again to step 501, if N is not a leaf node, the 'N' branch is taken. In this case, node N is an operation (rather than a variable or constant). The compiler first determines whether the operation indicated by node N has a counterpart in the set of operations available for decimal floating point arithmetic (step 502). If not, then it will be necessary to convert any DFP representations lower in the tree to another format before reaching node N. In this case, there is no reason for nodes lower in the tree to "inherit" a minDigits value from a higher node, and so minDigits(N) is set to zero (step 503). In either case, the compiler then calls a recursive process for analyzing an interior (non-leaf) node N, represented in FIG. 5 as step 504, and shown in greater detail in FIG. 6.

Referring to FIG. 6, an interior node N is processed by selecting a next unprocessed child node M of N (step 601). The value minDigits(M) is then initialized to the largest of: (a) minDigits(N); (b) length (in decimal digits) of M; and (c) length (in decimal digits) of the largest child node of M, if any (step 602). If the value of minDigits(M) so established is greater than 34 (the 'Y' branch from step 603), then minDigits(M) is set to 0 (step 604). As explained above with respect to steps 407-409, setting minDigits to 0 in this case allows a subtree of M to be converted to DFP even if M, or another child of M, is too large to use DFP.

The compiler then recursively calls the procedure for traversing an expression tree and performing DFP conversion, the procedure being called for that part of the alternate expression tree represented by node M, i.e., for which node M is the root (step 605). This is the recursive process illustrated in FIGS. 5 and 6, and beginning at block 500.

If any more children of node N remain to be processed, the compiler takes the 'Y' branch from step 606, and selects the next child M for processing at step 601. When all children of N have been processed, the 'N' branch is taken from step 606.

The compiler then determines whether the operation indicated by node N has a counterpart in the set of operations available for decimal floating point arithmetic (step 607). If not (the 'N' branch from step 607), it is impossible to perform further conversion of the subtree represented by node N. In this case, each previously processed child node M' of N must be of a type expected by node N. Since some of these trees may have been wholly or partially converted to a DFP format, the compiler replaces any processed child node M' in a DFP format with a conversion of the child node to the type expected by node N (step 612). I.e., the compiler inserts another node between M' and N, which performs a conversion of the DFP type in node M' to the type expected by node N. The compiler then returns from the recursive process.

If, at step 607, the operation specified by node N has a DFP counterpart, the 'Y' branch is taken. In this case, T is tentatively set to the largest type (i.e., the type having longest length) from among the processed children M' of N (step 608), where Packed Decimal is deemed to have a longer length than either DFP128 or DFP64. If the required precision of node N can not be represented in type T (the 'N' branch from step 609), then T is set to the smallest DFP type that can represent the required precision of N; if no DFP type can represent the precision of N, then T is set to Packed Decimal (step 610). In general, the required precision is the precision of a result of an operation; however, there are exceptions in which the required precision must take into account intermediate results. E.g., for an addition operation, the required precision is the larger of the precision specified for the result, and the precision of the largest operand plus 1. For a multiplication operation, the required precision is the larger of the precision specified for the result, and the sum of the precisions of the operands. If, at step 609, the required result precision of N can be represented in type T, step 610 is by-passed.

If T (as established by steps 608-610) is neither DFP64 nor DFP128 (the 'N' branch from step 611), then N cannot be converted to a DFP equivalent operation (either because one of the operands is too large or N itself requires too much precision). In this case, the compiler replaces any processed child node M' in a DFP format with a conversion of the child node to the type expected by node N (step 612), and returns from the recursive process. If T is either DFP64 or DFP128, the compiler continues to step 613.

The compiler then selects a next child M' of N, previously processed by steps 601-606, but not yet processed by steps 614-616 (step 613). if the type of node M' is other than type T (the 'N' branch from step 614), then the selected child node M' is replaced with a conversion of node M' to the DFP type T (step 615). I.e., a new node is interposed between node M' and node N, the new node comprising an appropriate conversion function for converting the type of node M' to type T. If Type(M') is already the same as T (the 'Y' branch from step 614), then step 615 is by-passed. In either case, if there are any more children M' of node N (the 'Y' branch from step 616), the compiler selects the next child at step 613. When all children M' of N have thus been processed, the 'N' branch is taken from step 616.

The compiler then replaces the operation of node N with a DFP equivalent operation or operations for operands of type T, using an applicable re-write rule from a set of re-write rules (step 617). The re-write rules specify a translation of each packed decimal operation to an equivalent operation or operations in DFP format, so that the DFP operations produce equivalent results in terms of precision, rounding, truncation, error messages, and so forth. Generally, a single packed decimal operation maps to a DFP operation performing a similar function (such as a multiplication), but in many cases the DFP operation performing the similar function must be accompanied by a rounding, truncation or shifting function to achieve results equivalent to the original packed decimal operation. Where a single operation of node N is replaced with multiple operations, one or more nodes representing the additional operation(s) are inserted into the tree. The exact re-write rules used will be dependent on the environment, particularly the processor instruction set and semantic requirements of the source programming language. A simplified set of sample re-write rules is contained in the Appendix below, it being understood that these rules may vary with a different environment.

After replacing the operation of node N with equivalent DFP operation or operations, the compiler returns from the recursive process.

Referring again to FIG. 4, after an entire tree has been analyzed (from step 404), the compiler proceeds directly to step 416. If a RHS subtree was analyzed (from step 410), the compiler again considers whether the LHS of the expression tree is a packed decimal variable (step 411). If so, the RHS of the alternate expression tree is converted to packed decimal. I.e., if the RHS of the alternate expression tree is of type DFP64 (the 'Y' branch from step 412), the RHS of ET' is replaced with CVTDFP64PD(RHS(ET')), where CVTDFP64PD is the conversion function which converts the DFP64 type to packed decimal (step 413). Similarly, if the RHS of the alternate expression tree is of type DFP128 (the 'Y' branch from step 414), the RHS of ET' is replaced with CVTDFP128PD(RHS(ET')), where CVTDFP128PD is the conversion function which converts the DFP128 type to packed decimal (step 415). In either case, conversion means that another node containing the appropriate conversion function is interposed between the root node of ET' and the root node of the RHS of ET'. If the LHS of the alternate expression tree is not a packed decimal variable, or if the RHS is not a DFP type, no further conversion is required.

If any more expression trees remain to be processed, the 'Y' branch is then taken from step 416, and the next expression tree ET is selected for processing. When all expression trees are thus processed, the 'N' branch is taken from step 416, completing the process of conversion to DFP format.

Referring again to FIG. 3, after completing any conversions in step 304, the compiler will have a set of original expression trees 218 and alternate expression trees 219 in converted form. The compiler then compares the "cost" of each alternate expression tree 219 with the "cost" of its corresponding original expression tree, and replaces any original expression tree with the corresponding alternate expression tree where the cost of the alternate tree is less (step 305). As used herein, "cost" may be any appropriate measure of the undesirability of using a particular formulation. Typically, "cost" will be some measure of processor execution burden at performance time, e.g., a measure of average processor cycles required for performing a set of operations. Cost could also take into account measure of code size or other factors. In the preferred embodiment, a respective cost is associated with each operation of the set of operations which might appear in an expression tree. The evaluation of cost involves summing the respective costs of each operation node of the expression tree. However, other measures of "cost" are possible.

The compiler then performs any compilation steps required to finish compilation, represented generally as step 306. Typically, these steps will include conventional back-end compilation steps, with possible optimizations. In performing the back-end compilation represented by step 306, the compiler uses the expression trees modified as described above, so that source code originally specifying constants, variables and operations in packed decimal is in fact automatically converted in appropriate circumstances to corresponding constants, variables and operations in a DFP format, without performing any changes to the original source code.

Figure 7:
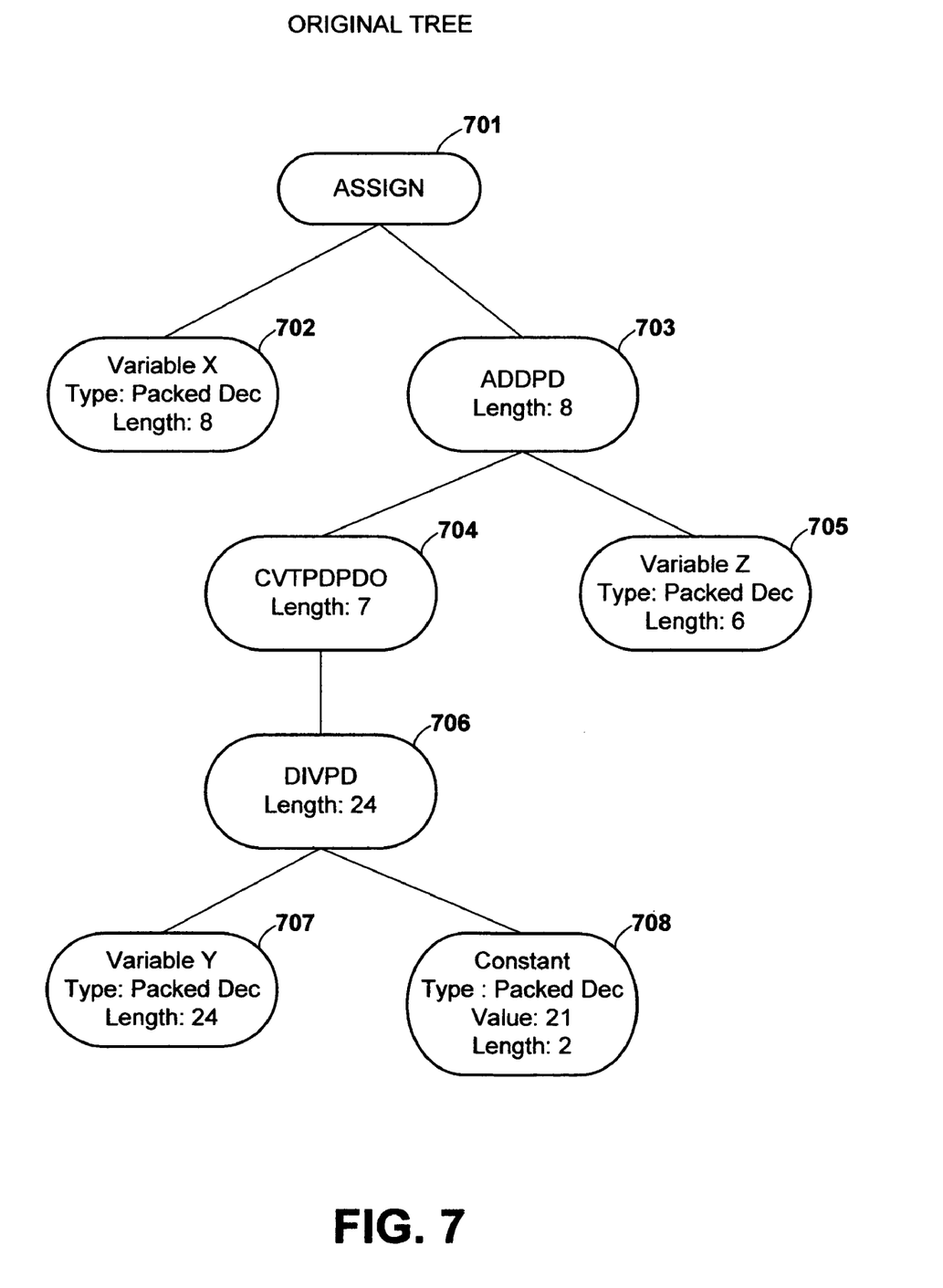
FIG. 7 is a simple example of an untransformed expression tree in which various operands and operations are in a packed decimal format.

An example of a simplified expression tree containing packed decimal values which is translated to a corresponding tree utilizing DFP arithmetic will now be given. FIG. 7 show an example of an original assignment expression tree for the assignment statement:

$X=(Y/21)+Z$.

As shown in FIG. 7, root node 701 is an assignment statement. The LHS is the single leaf node 702, representing the variable X receiving the assignment. This is a packed decimal of length 8. Nodes 703 and 706 represent add packed (ADDPD) and divide packed (DIVPD) operations, respectively. Nodes 707 and 708 represent a packed decimal variable of length 24, and a packed decimal constant of length 2, respectively. Node 704 is a conversion of the results of the division to a length of 7, with overflow checking. This operation truncates digits on the left of the packed number, producing an exception if any of these digits are nonzero. In this case, it is assumed that the programmer knows that Y/21 is expected to have no more than 7 digits, despite the fact that Y has a declared length of 24.It will be understood that FIG. 7 (and corresponding FIG. 8) is intended as a simplified example, and that the expression tree is presented in a simplified, conceptual form. An actual expression tree might contain additional data and be more complex. For example, it is assumed for purposes of illustration that the leaves are variables or constants, while a variable may in fact have a complicated addressing expression, as in the use of arrays.

Figure 8:
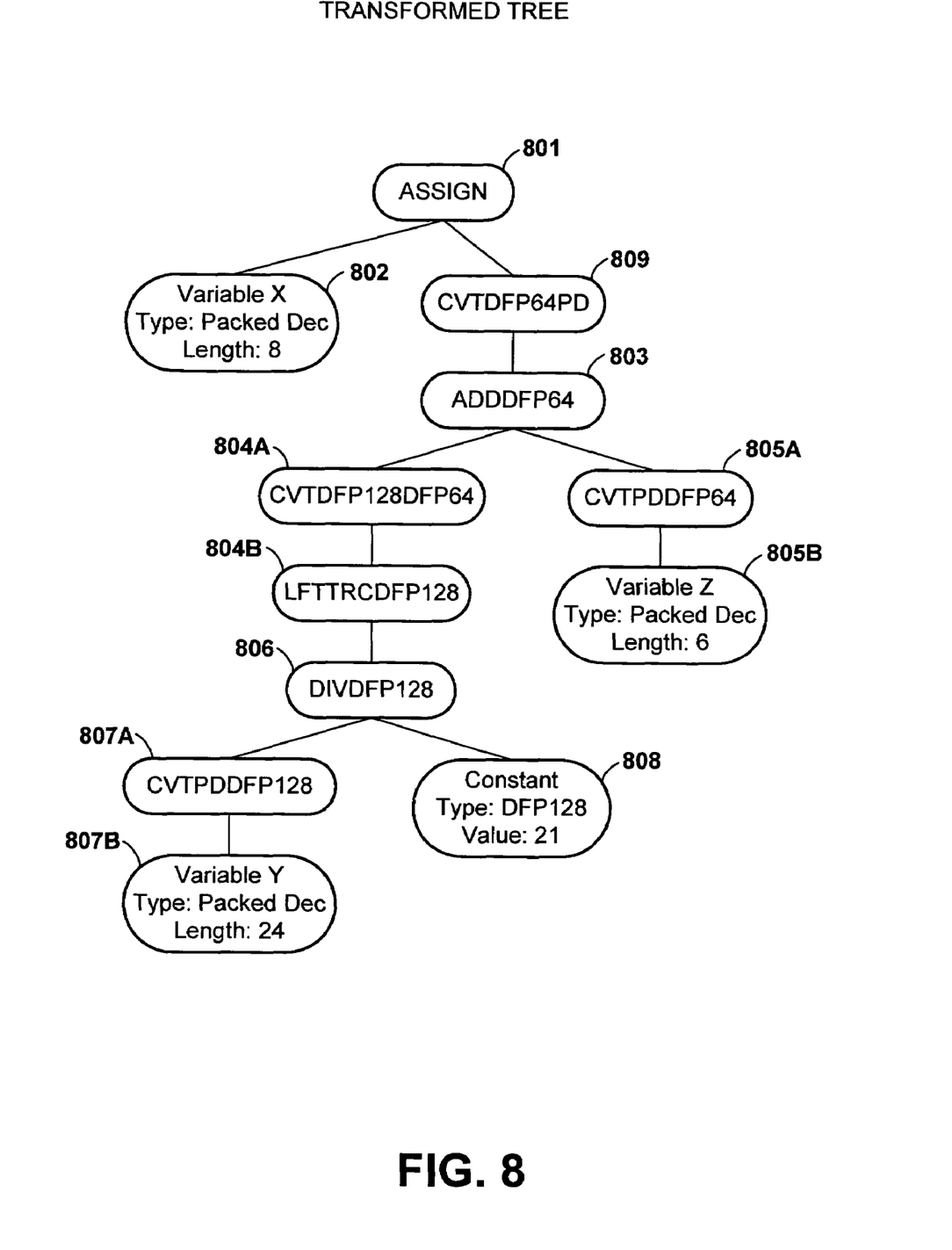
FIG. 8 is a transformed expression tree for the example of FIG. 7, in which certain operands and operations have been transformed to a corresponding DFP format, in accordance with the preferred embodiment.

FIG. 8 shows the fully translated equivalent expression tree using DFP arithmetic. As shown in FIG. 8, nodes 801 and 802 (the assignment and LHS) are unchanged from the original, but the RHS of the tree has been converted. In the RHS, node 803 corresponds approximately to original node 703, nodes 804A and 804B correspond to original node 704, nodes 805A and 805B correspond to original node 705, node 806 corresponds to original node 706, nodes 807A and 807B correspond to original node 707, and node 808 corresponds to original node 708. Additional node 809 is required to convert the DFP operand back to packed decimal for assignment to the variable X.

A description of the conversion process follows. Referring again to FIGS. 4-6, the compiler follows a path along steps 401, 402, 405, 407 (initializing minDigits to 8), 408 and 410 (calling recursive procedure of FIG. 5 for the tree having root node 703, invocation depth 1). Since node 703 is not a leaf, the compiler takes the path along steps 500, 501, 502 and 504 (calling recursive procedure of FIG. 6 for N=node 703, invocation depth 1).

The compiler chooses node 704 at step 601, sets minDigits (M) to 24 at step 602, takes the 'N' branch at step 603, and calls recursive procedure of FIG. 5 for the tree having root node 704 (invocation depth 2) at step 605. Since node 704 is not a leaf, the compiler again takes the path along steps 500, 501, 502 and 504 (calling recursive procedure of FIG. 6 for N=node 704, invocation depth 2).

The compiler chooses node 706 (the only child) at step 601, sets minDigits(M) to 24 at step 602, takes the 'N' branch at step 603, and calls recursive procedure of FIG. 5 for the tree having root node 706 (invocation depth 3) at step 605. Since node 706 is not a leaf, the compiler again takes the path along steps 500, 501, 502 and 504 (calling recursive procedure of FIG. 6 for N=node 706, invocation depth 3).

The compiler chooses node 707 at step 601, sets minDigits (M) to 24 at step 602, takes the 'N' branch at step 603, and calls recursive procedure of FIG. 5 for the tree having root node 707 (invocation depth 4) at step 605. In this case, node 707 is a leaf, and the compiler takes the path along steps 500, 501, 505, 513, 514, 515, 516, 518 (replacing original node 707 with a sub-tree consisting of nodes 807A and 807B) and 520. The compiler then returns to FIG. 6 at step 605, invocation depth 3, and continues to step 606.

Since there is another child of node 706, the 'Y' branch is taken to step 601. Node 708 is chosen at step 601, minDigits is set to 24, the 'N' branch is taken at step 603, and recursive procedure FIG. 5 is called for the tree having root node 708 (invocation depth 4) at step 605. Node 708 is a leaf, so the compiler takes the path along steps 500, 501, 505, 506, 507, 508, 510, 511 (replacing leaf node 708 with node 808, a constant of type DFP128), and 512. It will be observed that, although the original constant has a length of 2 and could be represented as a DFP64 value, a DFP128 value is imposed by the fact that minDigits is 24, inherited from the parent node. This avoid a later conversion of a DFP64 value to DFP128. The compiler then returns to FIG. 6 at step 605, invocation depth 3, and continues to step 606.

In this case, both children of node 706 have been processed, so the 'N' branch is taken from step 606. The compiler then takes the path along steps 607, 608 (setting T to DFP128), 609, 611 and 613. The loop from 613-616 is taken twice, but in both cases, the children (807 and 808) are of type DFP128, so step 615 is not executed. The compiler then takes the 'N' branch from step 616, and at step 617 replaces node 706 with node 806, which performs the equivalent DFP128 division. The compiler then returns to FIG. 5 at step 504 (invocation depth 3), and returns to FIG. 6 at step 605 (invocation depth 2).

There being no more children of node 704, the 'N' branch is taken from step 606. The compiler then takes the path along steps 607, 608 (setting T to DFP128), 609, 611, and 613. The is only one child of node 704, the previously processed node 706 (now node 806), which is chosen at step 613. Since the type of node 806 is already DFP128, step 615 is not executed, and the compiler takes the path along steps 614, 616 and 617.

At step 617, the compiler replaces node 704 with a DFP equivalent using the re-write rules. In this case, the original node 704 converts a packed decimal operand from a length of 24 to a length of 7, i.e., it left truncates the packed decimal operand. Obviously, it is expected that digits to the left of the $7^{th}$ digit will be zero, and an exception will be generated if this is not the case. The re-write rules replace the original node 704 CVTPDPDO operation with a subtree consisting of nodes 804A and 804B. Node 804B (the leaf) contains a left truncate operation, which is followed by a conversion to DFP64 (contained in node 804A, the root). It will be observed that in this case, two operations are necessary to maintain equivalent behavior. I.e., if a DFP128 operand is simply converted to DFP64, without first left truncating, then no exception would be generated if the result of the division at original node 706 was larger than expected (had more than 7 non-zero digits to the left of the decimal point). In this special case, the re-write rules change the type T to DFP64.

The compiler then returns to FIG. 5 at step 504 (invocation depth 2), which then returns to FIG. 6 at step 605 (invocation depth 1).

At this point, Node N is node 703, and the LHS of node N has been processed. Since the RHS of node N has not been processed, the compiler takes the 'Y' branch from step 606, chooses M=node 705 at step 601, sets minDigits(M) to 8 at step 602, takes the 'N' branch at step 603, and calls the recursive procedure of FIG. 5 for the sub-tree having root node 705 (invocation depth 2) at step 605. Since node 705 is a leaf, the compiler takes the path along steps 500, 501, 505, 513, 514, 515, 517 (replacing original node 705 with a sub-tree consisting of nodes 805A and 805B). The type of node 805A is set to DFP64 at step 519.

The compiler then returns to FIG. 6 at step 605, invocation depth 1, and continues to step 606. Since there are no more children of 703, the 'N' branch is taken to step 607. The compiler then takes the path along steps 607, 608 (setting T=DFP64), 609, 611, and 613. The loop at 613-616 will be traversed twice, but both children of are now of type DFP64, so step 615 will not be executed. The compiler then uses the re-write rules to change the packed decimal addition of original node 703 to a DFP64 addition of converted node 803 at step 617.

The compiler then returns to FIG. 5 at step 504 (invocation depth 1), which returns to FIG. 4, step 410.

Since the LHS of the expression tree (node 702) is a packed decimal, the 'Y' branch is taken from step 411. The compiler then takes the 'Y' branch from step 412, and at step 413 replaces the RHS of the alternate expression tree with a conversion of the RHS of the alternate expression tree to packed decimal format. I.e., the compiler replaces node 803 with a subtree in which node 803 is the leaf and node 809 is the root, node 809 containing the conversion operation CVTDFP64PD for converting a DFP64 operand to packed decimal. The processing of the expression tree of FIG. 7 to the alternate expression tree of FIG. 8 is then complete.

After constructing the alternate expression tree, the compiler would make a comparative cost analysis at step 305. In the original tree, the ADDPD (node 703) and CVTPDPDO (node 704) are relatively inexpensive operations, but a 24-digit packed decimal division (node 706) is an extremely expensive operation. The alternate tree of FIG. 8 contains more nodes, but all of the operations are relatively cheap. The DFP division (node 806) is slightly more expensive than the other operations in the alternative tree, but not nearly as expensive as the packed decimal division of node 706. Therefore, in this case the alternate tree would generally be considered cheaper.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, and as data storage devices 125-127.

Although a particular algorithm involving recursive traversal of an expression tree is disclosed herein as a preferred embodiment, it will be appreciated that numerous variations in the algorithm used to convert expressions in a fixed point format to a floating point format are possible. For example, an algorithm need not be recursive as described, and could be an iterative process which stores the recursion in data structures. Although the algorithm of the preferred embodiment uses existing expression trees generated by the compiler, alternative algorithms might use other representations and data structures. Furthermore, while the preferred embodiment has been described herein as part of a compilation process, the conversion of one type of representation to another type could be automatically performed as part of a different process, e.g., by an interpreter, a just-in-time compiler, a front-end or partial compiler which transforms source to an intermediate form, etc., as well as by a traditional compiler.

In accordance with the preferred embodiment, numeric data in packed decimal format is converted in appropriate circumstances to decimal floating point data in a proposed IEEE 754R standard format known as DFP. However, the present invention is not necessarily limited to conversion between these two formats, and in general could be applied to the conversion between any type of fixed point format to a floating point format having greater processor support. Specifically, because DFP has not yet been established as a standard, other or alternative floating point formats may become established as rival or replacement standards, and the present invention could convert from packed decimal to any such rival or replacement standard.

Although a specific embodiment of the invention has been disclosed along with certain alternatives, it will be recognized by those skilled in the art that additional variations in form and detail may be made within the scope of the claims which follow the Appendix herein.

APPENDIX OF SAMPLE RE-WRITE RULES

The following rules are a simplified example set of re-write rules for converting packed decimal operations to corresponding DFP operations. The original packed decimal operation appears in bold, with its parameters. This is replaced by AltExp as defined by the rules, where "operandn-DFPm" refers to the corresponding operand converted to an appropriate DFP type. In the examples given below, it is assumed that T is either DFP64 or DFP128; if not, the 'N' branch will be taken from step 611, and an appropriate conversion to an expected type will be made.

ADDPD [rsltDigits] operand1 [src1Digits] operand2 [src2Digits]
   If T=DFP64
   Then AltExp=ADDDFP64 operand1–DFP64 operand2–DFP64
   If [rsltDigits<(1+MAX(src1Digits,src2Digits))]
     Then AltExp=LFTTRCDFP64[rsltDigits](AltExp)
   Else
   AltExp=ADDDFP128 operand1–DFP128 operand2–DFP128
   If [rsltDigits<(1+MAX(src1Digits,src2Digits))]
     Then AltExp=LFTTRCDFP128[rsltDigits](AltExp)

Comment: ADDPD is an Add Packed Decimal instruction, and ADDDFP64 and ADDDFP128 are the corresponding add instructions for DFP64 and DFP128, respectively. In some cases, it is necessary to add a left truncate (LFTTRCDFP64 or LFTTRCDFP128) which truncates results (AltExp) left of rsltDigits to produce equivalent truncation of intermediate results. Subtraction is handled in an analogous manner.

DIVPD [rsltDigits] dividend [src1Digits] divisor [src2Digits]
   If T=DFP64
   Then AltExp=RNDEXPDFP64[0](DIVDFP64 dividend–DFP64 divisor–DFP64)
   If [rsltDigits<src1Digits]
     Then AltExp=LFTTRCDFP64[rsltDigits](AltExp)
   Else
   AltExp=RNDEXPDFP128[0](DIVDFP128 dividend–DFP128 divisor–DFP128)
   If [rsltDigits<src1Digits]
     Then AltExp=LFTTRCDFP128[rsltDigits](AltExp)

Comment: DIVPD is a Divide Packed Decimal instruction, and DIVDFP64 and DIVDFP128 are the corresponding divide instructions for DFP64 and DFP128, respectively. RNDEXPDFP64[0] and RNDEXPDFP128[0] convert the DFP results to a DFP number having exponent of 0, and round the mantissa if necessary. As in the case of an add, it is sometimes necessary to add a left truncate (LFTTRCDFP64 or LFTTRCDFP128) to produce equivalent truncation of intermediate results. Although only a single division operation is shown in this example, a complete set of operations will typically contain multiple division operations, having different forms of rounding, treatment of divide-by-zero errors or overflows/underflows, etc.

MULPD [rsltDigits] multiplicand [src1Digits] multiplier [src2Digits]
   If T=DFP64
   Then AltExp=MULDFP64 multiplicand–DFP64 multiplier–DFP64)
   If [rsltDigits<(src1Digits+src2Digits)]
     Then AltExp=LFTTRCDFP64[rsltDigits](AltExp)
   Else
   AltExp=MULDFP128 multiplicand–DFP128 multiplier–DFP128)
   If [rsltDigits<(src1Digits+src2Digits)]
     Then AltExp=LFTTRCDFP128[rsltDigits](AltExp)

Comment: MULPD is a Multiply Packed Decimal instruction, and MULDFP64 and MULDFP128 are the corresponding multiply instructions for DFP64 and DFP128, respectively. As in the case of an add or divide, it is sometimes necessary to add a left truncate (LFTTRCDFP64 or LFTTRCDFP128) to produce equivalent truncation of intermediate results.

SHFLFTPD [rsltDigits] operand [srcDigits] [shiftamt]
   If T=DFP64
   Then AltExp=SHFLFTDFP64 operand–DFP64 [shiftamt]
   If [rsltDigits<(srcDigits+shiftamt)]
     Then AltExp=LFTTRCDFP64[rsltDigits](AltExp)
   Else
   AltExp=SHFLFTDFP128 operand–DFP128 [shiftamt]
   If [rsltDigits<(srcDigits+shiftamt)]
     Then AltExp =LFTTRCDFP128[rsltDigits](AltExp)

Comment: SHFLFTPD is a Shift Left Packed Decimal instruction, and SHFLFTDFP64 and SHFLFTDFP128 are the corresponding shift left instructions for DFP64 and DFP128, respectively. As in the case of other arithmetic instructions, it is sometimes necessary to add a left truncate (LFTTRCDFP64 or LFTTRCDFP128) to produce equivalent truncation of intermediate results. Although only a single shift left operation is shown in this example, a complete set of operations may contain multiple shift left operations or options, corresponding to different forms of rounding or truncation. A right shift is handled in an analogous manner.

CVTBIN4PD [rsltDigits] operand
   If T=DFP64
   Then AltExp=CVTBIN4DFP64 operand
   If [rsltDigits<10]
     Then AltExp=LFTTRCDFP64[rsltDigits](AltExp)
   Else
   Then AltExp=CVTBIN4DFP128 operand
   If [rsltDigits<10]
     Then AltExp=LFTTRCDFP128[rsltDigits](AltExp)

Comment: CVTBIN4PD is a conversion instruction which converts a 4-byte signed binary operand to packed decimal, and CVTBIN4DFP64 and CVTBIN4DFP128 are the corresponding conversion instructions for converting the 4-byte signed binary operand into DFP64 and DFP128, respectively. It is sometimes necessary to add a left truncate (LFTTRCDFP64 or LFTTRCDFP128) to produce equivalent truncation of intermediate results. It will be appreciate that analogous rules with be used for converting other types of operands to DFP, or for converting from DFP to other types of operands.

What is claimed is:

1. A method for producing computer programming code, comprising the computer-executed steps of:
   receiving source code, said source code containing a plurality of operations, each on a respective at least one operand in a fixed point representation; automatically generating executable code from said source code, said step of automatically generating executable code comprising:
   (a) automatically making a respective selective determination, for each of a plurality of said operations, whether to execute the respective operation in a floating point representation comprising the steps of:
     (i) automatically generating a first relative execution performance cost associated with a first code version containing said code converting the respective at least one operand in said fixed point representation to a corresponding at least one operand in a floating point representation, said code performing a corresponding operation on the corresponding at least one operand in a said floating point representation, and said code re-converting at least one result of said corresponding operation on the corresponding at least one operand in a said floating point representation to said fixed point representation;

(ii) automatically generating a second relative execution performance cost associated with a second code version containing code performing the respective operation on the respective at least one operand in a said fixed point representation; and (iii) automatically selecting one of said first code version and said second code version for inclusion in said executable code based on a comparison of said first relative execution performance cost with said second relative execution performance cost;

(b) with respect to each operation for which said step of automatically making a selective determination determines to execute the respective operation in said floating point representation:

(i) automatically generating code converting the respective at least one operand in said fixed point representation to a corresponding at least one operand in a said floating point representation;

(ii) automatically generating code performing-a corresponding operation on the corresponding at least one operand in said floating point representation, said corresponding operation on said the corresponding at least one operand in said floating point representation corresponding to the respective operation on at least one operand in said fixed point representation; and (iii) automatically generating code re-converting at least one result of said corresponding operation on said the corresponding at least one operand in said floating point representation to said fixed point representation: and (c) with respect to each operation for which said step of automatically making a selective determination determines not to execute the respective operation in said floating point representation, automatically generating code performing the respective operation on the respective at least one operand in said fixed point representation.

2. The method for producing computer programming code of claim 1, wherein said fixed point representation is a packed decimal representation.

3. The method for producing computer programming code of claim 1, wherein said floating point representation is a Decimal Floating Point (DFP) representation.

4. The method for producing computer programming code of claim 1, wherein said step of automatically generating executable code from said source code comprises automatically traversing an expression tree to identify expressions in said fixed point representation which can be converted to said floating point representation.

5. The method for producing computer programming code of claim 4, wherein said step of automatically generating executable code from said source code comprises: automatically identifying a first subset of said expression tree which can not be converted to said floating point representation; automatically identifying a second subset of said expression tree which can be converted to said floating point representation; and automatically generating code converting expressions to said second subset to said floating point representation, without converting expressions of said first subset to said floating point representation.

6. The method for producing computer programming code of claim 1, wherein said step of automatically generating executable code from said source code further comprises the step of automatically choosing said floating point representation from among a plurality of floating point representations of different sizes, said automatically choosing step choosing a smallest sized floating point representation, from among said plurality of floating point representations of different sizes, which is capable of representing said at least one operand, said at least one operation, and said at least one result.

7. The method for producing computer programming code of claim 1, wherein said step of automatically generating code performing at least one operation on said at least one operand comprises automatically generating code performing a plurality of successive operations on a plurality of operands, wherein a result of a first of said plurality of operation in said floating point representation is used as an operand of a second of said plurality of successive operations without re-converting to said fixed point representation.

* * * * *